(12) United States Patent
Mizukoshi

(10) Patent No.: US 7,600,725 B2
(45) Date of Patent: Oct. 13, 2009

(54) CLAMP FOR ELONGATED MEMBER SUCH AS PIPE

(75) Inventor: Suguru Mizukoshi, Yuki (JP)

(73) Assignee: Newfrey, LLC, Newark, DE (US)

( * ) Notice: Subject to any disclaimer, the term of this patent is extended or adjusted under 35 U.S.C. 154(b) by 0 days.

(21) Appl. No.: 11/892,259

(22) Filed: Aug. 21, 2007

(65) Prior Publication Data

US 2008/0048072 A1      Feb. 28, 2008

(30) Foreign Application Priority Data

Aug. 24, 2006   (JP) .............................. 2006-227965

(51) Int. Cl.
*F16L 3/12* (2006.01)
(52) U.S. Cl. ..................... 248/74.1; 24/16 PB
(58) Field of Classification Search ............ 248/74.1, 248/74.2, 68.1; 24/16 PB
See application file for complete search history.

(56) References Cited

U.S. PATENT DOCUMENTS 5,926,921 A * 7/1999 Benoit ............... 24/16 PB
6,371,419 B1 * 4/2002 Ohnuki ............... 248/74.2

FOREIGN PATENT DOCUMENTS

| FR | 2577649 | 8/1986 |
|---|---|---|
| FR | 2578006 | 8/1986 |
| JP | 64-27512 U | 2/1989 |
| JP | 2001099357 | 4/2001 |
| JP | 2004044698 | 2/2004 |
| JP | 2005133783 | 5/2005 |
| JP | 2005240837 | 9/2005 |

* cited by examiner

*Primary Examiner*—Ramon O Ramirez
(74) *Attorney, Agent, or Firm*—Stephen R. Valancius; Michael P. Leary

(57) ABSTRACT

A clamp 10 for an elongated member comprises a receiving portion 22 and a resilient retaining wing 27 which has a connection end 33 connected to an upper edge of a side wall 25 of the receiving portion 22. The resilient retaining wing 27 has a first portion extending from an intermediate position 35 to a distal end 34 and a second portion extending from the connection end 33 to the intermediate position 35. The second portion is formed to extend toward a bottom of the receiving portion 22 obliquely at a predetermined small angle α relative to the side wall 25 so as to increase a distance (b) between a point of action (33) and a point of application (35), and the first portion is formed to be bent in a direction away from the side wall 25 so as to narrow a width of a pull-out passage for the elongated member.

15 Claims, 3 Drawing Sheets

CLAMP FOR ELONGATED MEMBER SUCH AS PIPE

CROSS REFERENCE TO RELATED APPLICATION

This application claims the benefit of Japanese Application No. 2006-227965 filed Aug. 24, 2006, incorporated herein by reference.

BACKGROUND OF INVENTION

The present invention relates to a clamp for an elongated member such as a pipe, which comprises a receiving portion defining a chamber for receiving and holding the elongated member therein, and a resilient retaining wing extending obliquely from an inlet toward a bottom of the receiving portion.

A clamp for an elongated member such as a pipe has been well-known which comprises a receiving portion defining a chamber for receiving and holding the elongated member therein, and a resilient retaining wing extending obliquely from an inlet toward a bottom of the receiving portion, wherein the resilient retaining wing has flexibility to be bendingly displaced closer to a side wall of the receiving portion when the elongated member is pressed into the receiving portion, and then engaged with an outer peripheral surface of the elongated member received in the receiving portion, so as to produce a resistance against pull-out of the elongated member from the receiving portion.

FIG. 1 shows a receiving portion of a typical clamp for an elongated member 3 such as a pipe. The receiving portion 1 defining a chamber for receiving and holding an elongated member therein is formed with a pair of resilient retaining wings 2 each extending obliquely from an inlet toward a bottom of the receiving portion. Each of the resilient retaining wings 2 has flexibility to be bendingly displaced closer to a side wall 5 of the receiving portion 1 when the elongated member 3 is pressed into the receiving portion 1. Immediately after the elongated member 3 is received in the receiving portion 1, each of the resilient retaining wings 2 will return to its original posture in such a manner that a distal end 6 thereof is engaged with an outer peripheral surface of the elongated member 3 to produce a resistance against pull-out of the elongated member 3 from the receiving portion.

Each of the resilient retaining wings 2 has one end connected to an inlet of the receiving portion 1, and can be displaced closer to a side wall 5 bendingly about the connection end serving as a support point, in its entirety. As shown in FIG. 1, when the elongated member 3 is pressed into the receiving portion 1, the elongated member 3 applies a pressing force to the resilient retaining wings 2 to cause bending thereof. In the typical clamp illustrated in FIG. 1, a distance "a" between a point 7 of application of a pressing force to the resilient retaining wing 2, and a point 8 of action of the pressing force causing the bending displacement about the support point is very short as illustrated. Thus, an insertion force for the elongated member becomes larger to cause an increase in workload on an operator in charge of insertion of a pipe or the like. If the resilient retaining wing is formed to have a lower strength so as to reduce the insertion force, the resistance against pull-out of the elongated member retained thereby will be deteriorated. Therefore, in a clamp for an elongated member such as a pipe, there is the need for reducing an insertion force of the elongated member to a receiving portion and increasing a pull-out resistance after insertion.

The following Patent Documents 1 to 5 disclose various types of elongated-member clamps:

[Patent Document 1] Japanese Patent Laid-Open publication No. 2001-099357
[Patent Document 2] Japanese Patent Laid-Open publication No. 2004-044698
[Patent Document 3] Japanese Patent Laid-Open publication No. 2005-133783
[Patent Document 4] Japanese Patent Laid-Open publication No. 2005-240837
[Patent Document 5] Japanese U. M. Laid-Open publication No. 64-027512

Each of the elongated-member clamps disclosed in the Patent Documents 1 to 4 comprises a receiving portion, and a resilient retaining wing extending obliquely from an inlet toward a bottom of the receiving portion, wherein the resilient retaining wing has flexibility to be bendingly displaced closer to a side wall of the receiving portion when the elongated member is pressed into the receiving portion, and then engaged with an outer peripheral surface of the elongated member received in the receiving portion so as to produce a resistance against pull-out of the elongated member from the receiving portion. More specifically, in the clamp disclosed in the Patent Document 1, with a view to allowing plural types of pipes different in diameter to be received and held in a receiving portion, the receiving portion is provided with a pair of resilient retaining wings, a pair of resilient horizontal wings disposed on the side of a bottom of the receiving portion in parallel relation to the bottom, and a pair of clamping segments disposed in longitudinally parallel relation to a combination of the resilient retaining wings and the resilient horizontal wings. In the clamp disclosed in the Patent Document 2, with a view to reducing an insertion force for a pipe or the like and sufficiently ensuring a length of a resilient retaining wing, the resilient retaining wing has a connection end connected to an inlet of a receiving portion and formed with a void of a predetermined length. In the clamp disclosed in the Patent Document 3, a receiving portion is formed with a pair of first resilient retaining wings, and a pair of second resilient retaining wings extending from respective ones of intermediate positions of the first resilient retaining wings, toward a bottom of the receiving portion and beyond a distal end of the first resilient retaining wing, so as to reduce an insertion force while ensuring a resistance against pull-out of a pipe or the like. In the clamp disclosed in the Patent Document 4, with a view to allowing plural types of pipes different in diameter to be received and held in a receiving portion, the receiving portion is provided with two pairs of first resilient retaining wings, a pair of second resilient retaining wings each disposed between a corresponding one of the pairs of first resilient retaining wings to extend closer to a bottom of the receiving portion than the pair of first resilient retaining wings, and a pair of third resilient retaining wings disposed on the side of the bottom.

The clamp disclosed in the Patent Document 5 is a type devoid of a resilient retaining wing extending from an inlet of a receiving portion, wherein each of two outer ones of three end walls defining two receiving portions has flexibility, and each of the receiving portions has a bottom formed with a resilient tubular portion, so that, even if a pipe or the like varies in outer diameter thereof, the clamp can resiliently hold the pipe after insertion, while absorbing the variation.

Although each of the clamps disclosed in the Patent Documents 1 to 4 has a resilient retaining wing adapted to retain an elongated member such as a pipe received in the receiving portion so as to produce a resistance against pull-out of the elongated member, there remains the need for improvement in that each of the clamps involves some complexity in configuration. Even in the clamp disclosed in the Patent Document 2 which has a relatively simpler structure than the clamps disclosed in the Patent Documents 1, 3, and 4, it is necessary to form a void of a predetermined length in the connection end at the inlet of the receiving portion. Moreover, the formation of the void is likely to lower the strength of the resilient retaining wing and thereby deteriorate the resistance against pull-out of a pipe or the like held in the receiving portion. The clamp disclosed in the Patent Document 5 has no resilient retaining wing and thereby it is difficult to achieve high pull-out resistance.

BRIEF DESCRIPTION OF THE INVENTION

It is therefore an object of the present invention to provide a clamp for an elongated member such as a pipe, which is capable of allowing the elongated member to be inserted therein with a relatively low insertion force and holding the elongated member while keeping a resistance against pull-out of the elongated member at high level, with a simple structure.

In order to achieve this object, the present invention provides a clamp for an elongated member, which comprises a receiving portion defining a chamber for receiving and holding the elongated member therein, and a resilient retaining wing extending obliquely from an inlet toward a bottom of the receiving portion. The resilient wing has flexibility to be bendingly displaced closer to a side wall of the receiving portion when the elongated member is pressed into the receiving portion, so as to allow the elongated member to pass therethrough, and then engaged with an outer peripheral surface of the elongated member received in the receiving portion so as to produce a resistance against pull-out of the elongated member from the receiving portion.

The clamp is characterized in that the resilient retaining wing has a connection end connected to the inlet of the receiving portion to serve as a support point for allowing the entire resilient retaining wing to be bendingly displaced closer to a side wall of the receiving portion thereabout. The resilient retaining wing is formed to be bent in a direction away from the side wall of the receiving portion at an intermediate position located between the connection end and a distal end of the wing so as to make the width of a passage for the elongated member narrower in a first portion between the intermediate position and the distal end than in a second portion between the connection end and the intermediate position. A point of application of a pressing force during the insertion of the elongated member is set at the intermediate position, and a point of action of the pressing force is set at the connection end. The second portion of the resilient retaining wing is formed to extend toward the bottom of the receiving portion obliquely at a predetermined small angle relative to the side wall of the receiving portion so as to increase a distance between the point of application and the point of action, whereby, when an elongated member is received in the receiving portion, the distal end of the resilient retaining wing is engaged with the outer peripheral surface of the elongated member to produce a resistance against pull-out of the elongated member from the receiving portion.

Based on a simple structure where the second portion of the resilient retaining wing between the intermediate position which is a point of application of a pressing force during the insertion of the elongated member, and the connection end which is a point of action of the pressing force, is formed to extend at a predetermined small angle relative to the side wall of the receiving portion so as to increase the distance between the point of application and the point of action, a width of a passage for inserting the elongated member through the second portion of the resilient retaining wing is increased to facilitate the insertion. Thus, the elongated member can be inserted into the receiving portion with a lower insertion force. Further, the resilient retaining wing is formed to be bent at the intermediate position in a direction for increasing a distance from a side wall of the receiving portion so as to narrow the width of the passage for the elongated member through the first portion of the resilient retaining wing. This allows the distal end of the resilient retaining wing to be reliably engaged with the outer peripheral surface of the elongated member so as to effectively provide enhanced resistance against pull-out of the inserted elongated member from the receiving portion. In addition, even if an elongated-member pull-out force is applied to the resilient retaining wing, the second portion of the resilient retaining wing extending at the predetermined small angle relative to the side wall of the receiving portion can resist the pull-out force so as to maintain the resistance against pull-out of the elongated member at high level.

Preferably, the clamp of the present invention includes a pair of the resilient retaining wings extending obliquely from respective inner surfaces of opposed side walls of the receiving portion, toward the bottom of the receiving portion. Further, in a clamp for an elongated cylindrical member, the intermediate positions in the pair of resilient retaining wings are preferably set to allow an interior angle between two lines connecting a center of the cylindrical member in contact with the pair of resilient retaining wings and respective ones of two contact points at the intermediate positions, with the interior angle being greater than 100 degrees.

In the clamp of the present invention, the resilient retaining wing is preferably formed as a plate which has a width extending in a longitudinal direction of the elongated member held in the receiving portion, a length extending from the connection end to the distal end, and a thickness gradually increasing at least in the first portion extending from the intermediate position to the distal end. In the clamp of the present invention, the predetermined small angle is preferably in the range between 10 to 20 degrees. In the clamp of the present invention, the second portion of the resilient retaining wing extending from the connection end to the intermediate position preferably has a length slightly greater than half of an entire length of the resilient retaining wing.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

FIGS. 2 to 6 show a clamp 10 including a plurality of holding portions for elongated members, such as fuel pipes, brake oil pipes, and wire harness (hereinafter referred to collectively as "elongated member" unless otherwise specified) according to one embodiment of the present invention.

Figure 6:
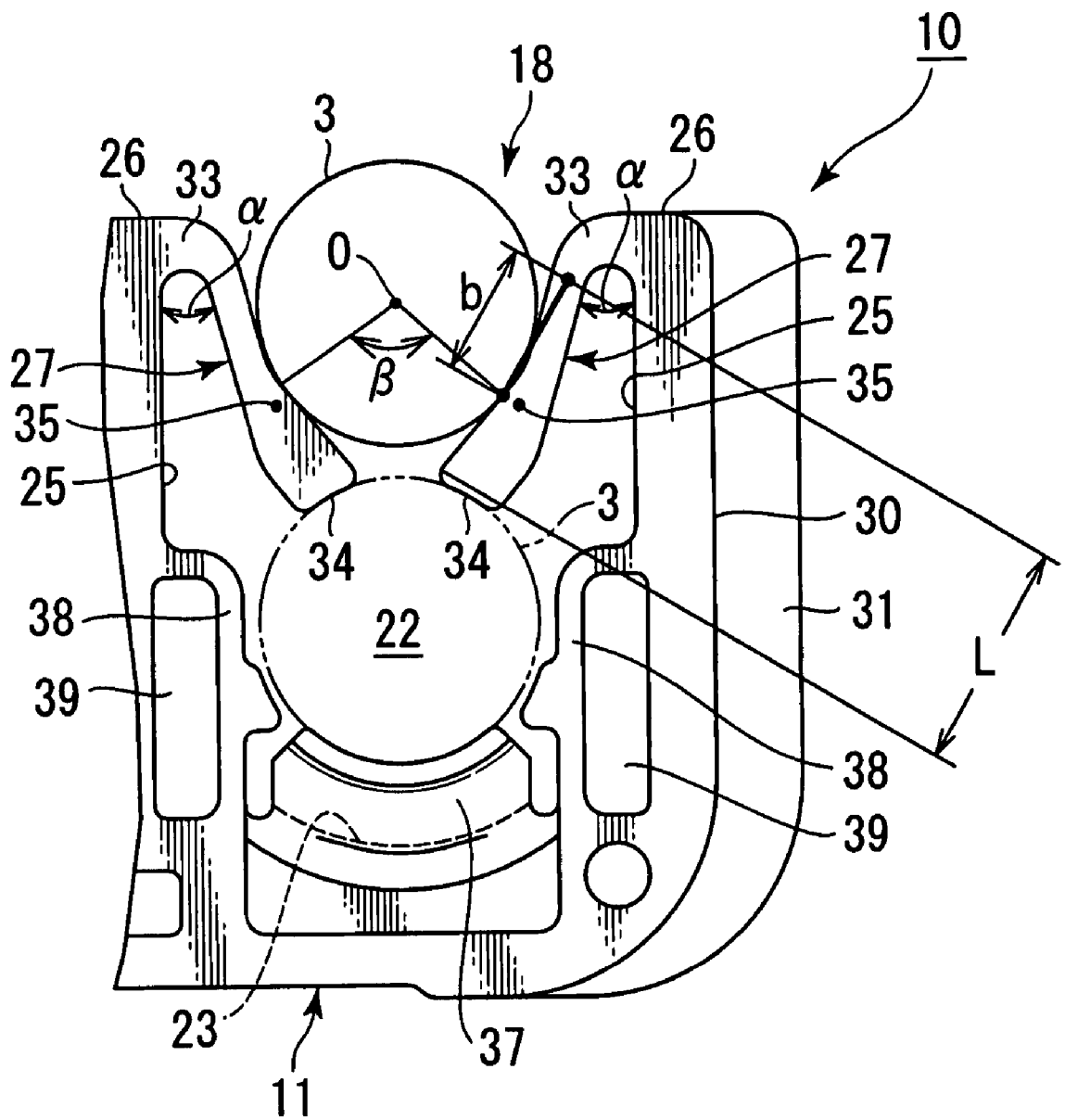
FIG. 6 is an enlarged view of the portion surrounded by square chain line A in the clamp of FIG. 3.

FIGS. 2 to 5 show an entire structure of the clamp 10. FIG. 6 shows a detailed structure of a receiving portion 22 of a holding portion 18 as one example of holding portions according to this embodiment in the clamp 10, wherein the holding portion 18 corresponds to the rectangular area surrounded by a chain line A in FIG. 3. FIG. 6 also shows a relationship between a point of application of a pressing force during an insertion of an elongated member 3 into the receiving portion 22, and a point of action of the pressing force.

The clamp 10 comprises a base 11, six holding portions 13 to 18 integrally formed with the base 11, and an anchor-leg 20 integrally formed with the base 11 to serve as fixing means for fixing the clamp 10 to a support such as a vehicle body. The base 11, the holding portions 13 to 18 and the anchor-leg 20 are preferably made of a hard resin material (plastic) in one piece. The fixing means to the support is not limited to the anchor-leg 20. For example, the support may be provided with a stud bolt extending upright therefrom, and the fixing means may be a portion engageable with the stud. The fixing means is not essential to the present invention.

Each of the holding portions 13 to 18 may be formed in any size and configuration to hold various elongated members. Further, the number of the holding portions and/or the dimensions and/or configuration of the holding portions may be appropriately selected depending on types, sizes and/or configurations of target elongated members. In the clamp 10, each of the holding portions 13, 14, 17, 18 is a type according to this embodiment of the invention, while each of the remaining holding portions 15, 16 is a conventional type. Each of the holding portion 13, 18 has an outer wall 30 formed with a rib 31 which extends upwardly from the base 11 to provide enhanced strength.

Figure 1:
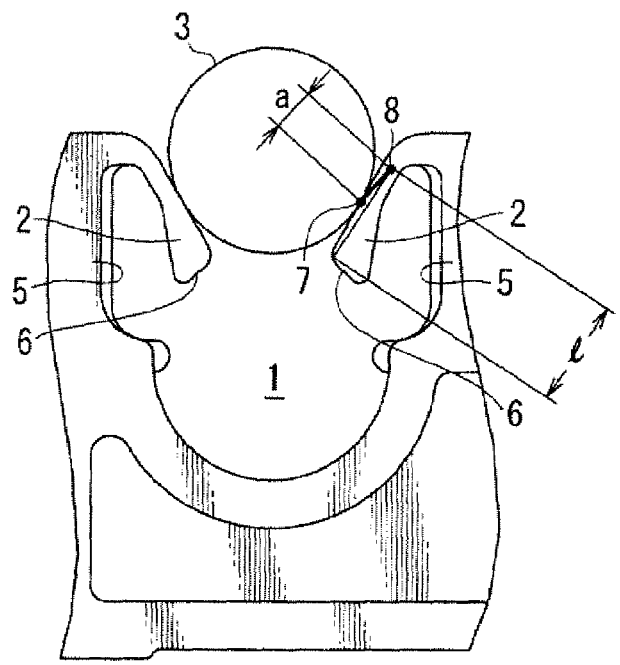
FIG. 1 is a front view of a pipe receiving portion of a conventional clamp.
Figure 2:
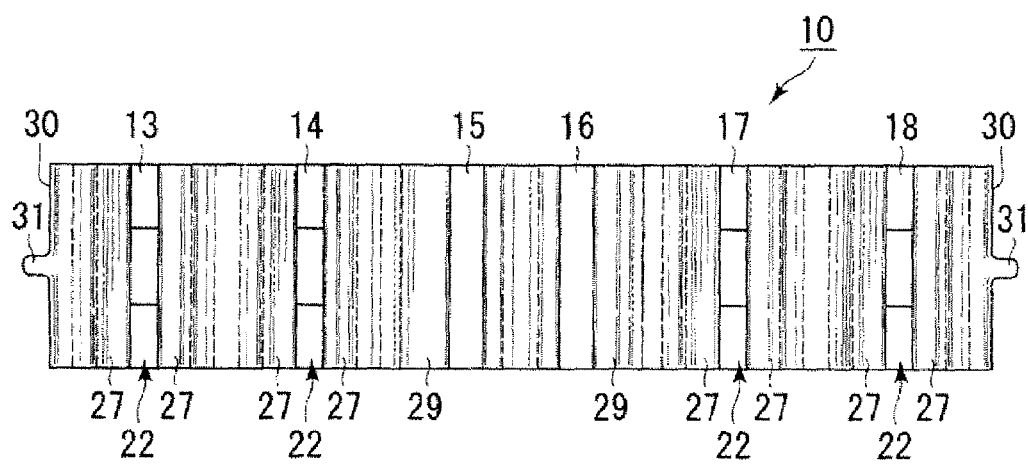
FIG. 2 is a plan view of a clamp for an elongated member in a preferred embodiment according the present invention.
Figure 3:
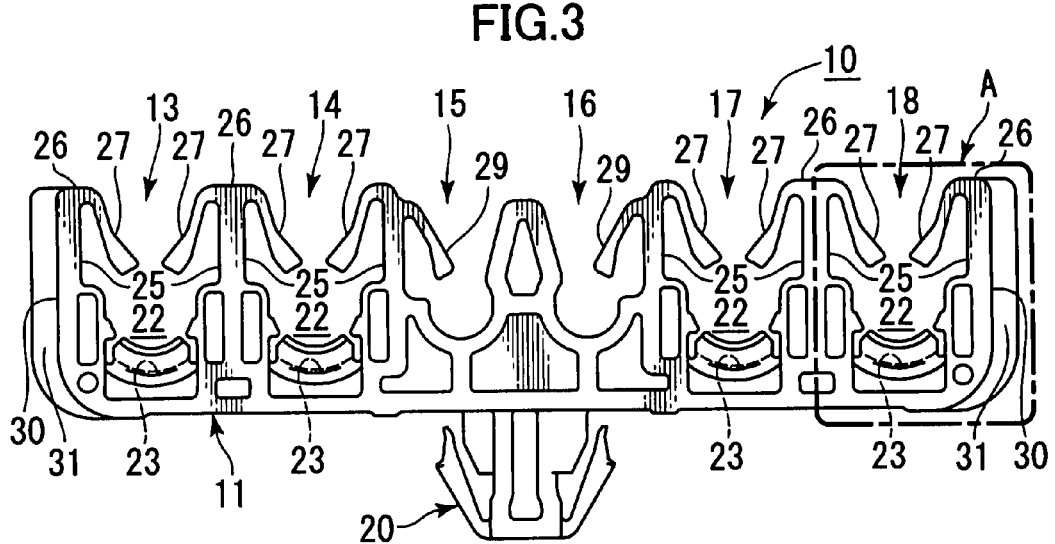
FIG. 3 is a front view of the clamp in FIG. 2.
Figure 4:
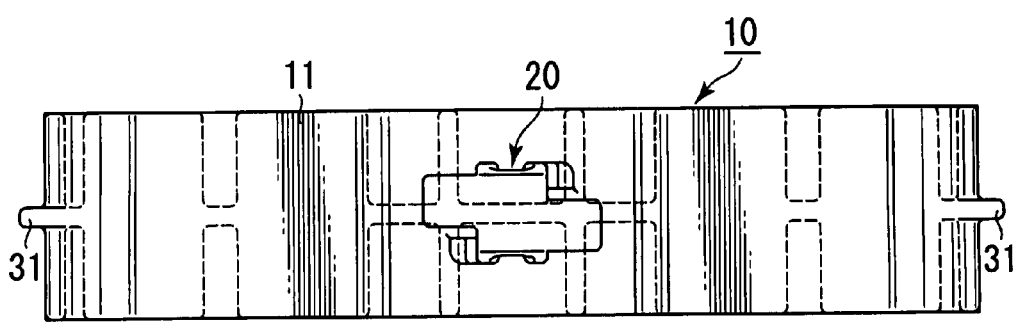
FIG. 4 is a bottom view of the clamp in FIG. 2.
Figure 5:
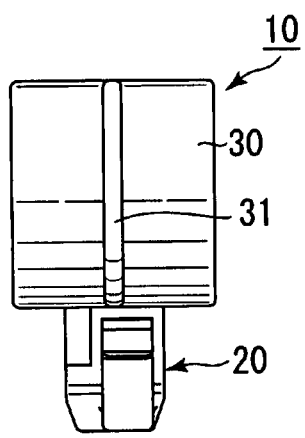
FIG. 5 is a right side view in FIG. 2.

Each of the holding portions 13, 14, 17, 18 comprises a curved bottom 23, and a pair of opposed side walls 25 extending upwardly from respective opposite edges of the bottom 23. The bottom 23 and the side walls 25 form a receiving portion 22 defining a chamber for receiving and holding an elongated member. Each of the holding portions 13, 14, 17, 18 includes a pair of resilient retaining wings 27, each adapted to retainingly press an upper and slightly laterally outward region of an outer peripheral surface of an elongated member received and held in the receiving portion 22. Each of the resilient retaining wings 27 is formed to extend obliquely from an inlet edge 26 of a corresponding side wall 25 of the receiving portion 22 toward the bottom 23. The structure of the resilient retaining wing 27 will be specifically described later. In this embodiment, a pair of resilient retaining wings 27 is provided in each of the holding portions 13, 14, 17, 18. Alternatively, as long as a sufficient retaining force is obtained, a single resilient retaining wing may suffice. Each of the holding portions 15, 16 is formed with a resilient retaining wing 29. This configuration of the resilient retaining wing 29 is a conventional type having the same function as that of the resilient retaining wing 2 illustrated in FIG. 1.

Each of the resilient retaining wings 27 has resiliency to be bendingly deformed closer to an adjacent side wall 25 of a receiving portion 22 when an elongated member is pressed into the receiving portion 22, so as to allow the elongated member to pass therethrough, and then restored to its original position after the passing of the elongated member, so that the distal end of the resilient retaining wing 27 is engaged with an outer peripheral surface of the elongated member received in the receiving portion 22, so as to produce a resistance against pull-out of the elongated member from the receiving portion 22.

With reference to FIG. 6, a holding portion according to this embodiment of the clamp 10 will be specifically described. FIG. 6 shows the holding portion 18 corresponding to the rectangular area surrounded by the chain line A in FIG. 3. Although not specifically illustrated, each of the holding portions 13, 14, 17 has the same structure as that of the holding portion 18, and therefore the following description of the holding portion 18 is applicable thereto.

In FIG. 6, each of the pair of resilient retaining wings 27 has a connection end 33 connected to an edge 26 of a corresponding one of the side walls 25 at an inlet to a receiving portion. The connection end 33 serves as a support point (or fulcrum) when the entire resilient retaining wing 27 is bendingly displaced closer to the corresponding side wall 25 of the receiving portion 22. Each of the pair of resilient retaining wings 27 has a first portion extending between its distal end and an intermediate position 35, and a second portion extending between the connection end 33 and the intermediate position 35. The second portion of the resilient retaining wing 27 is formed to extend toward the bottom 23 of the receiving portion 25 obliquely at a predetermined small angle α relative to the corresponding side wall 25 of the receiving portion 20. Further, each of the resilient retaining wings 27 is formed to be bent in a direction away from the corresponding side wall 25 of the receiving portion at the intermediate position 35, so that the resilient retaining wing 27 has a first portion extending from the intermediate position 35, i.e., a bent portion, to the distal end 34 to narrow a width of a passage for the elongated member. A point of application of a pressing force (or power point) during an insertion of the elongated member 3 into the receiving portion 22 is set at the intermediate position 35, and a point of action of the pressing force (or working point) is set the connection end 33 about which the bending displacement occurs. The second portion of the resilient retaining wing 27 extending from the connection end 33 to the intermediate position 35 is formed to extend toward the bottom 23 of the receiving portion obliquely at the predetermined small angle α relative to the corresponding side wall 25 of the receiving portion, as described above. Thus, a distance "b" between the point of action and the point of application of pressing force can be increased as compared with a distance "a" in FIG. 1.

Each of the resilient retaining wings 27 is formed as a plate which has a width (the upward/downward direction in the drawing sheet of FIG. 2) extending in an longitudinal direction of the elongated member held in the receiving portion 22, and a length between the connection end 33 and the distal end 34. Further, at least the first portion of the resilient retaining wing 27 extending from the intermediate position 35 to the distal end 34 is formed to have a thickness which gradually increases toward the distal end 34, as shown in FIG. 6. This configuration makes it possible to desirably minimize an insertion resistance during insertion of the elongated member and desirably maximize a resistance against pull-out of the inserted elongated member. Preferably, a surface of the resilient retaining wing 27 facing away from the corresponding side wall 25 is concave as shown in FIG. 6.

The bottom 23 of the receiving portion 22 is provided with a pair of resilient elements 37 which extend in the longitudinal direction of the elongated member. More specifically, the resilient elements 37 are formed to extend from the transversely (the upward/downward direction in the drawing sheet of FIG. 2) central position of the receiving portion 22 toward respective ones of opposite outer edges of the receiving portion 22 in such a manner as to be resiliently separable from the bottom 23. This resilient element 37 has a structure similar to the resilient tubular portion disclosed in the Patent Document 5 (JU 64-027512A). The resilient elements 37 make it possible to prevent wobbling movements of the held elongated member, and cope with variations in outer diameter of the elongated member. Preferably, a pair of resilient walls 38 are formed on opposite sides of the resilient elements 37 and in parallel relation to the side walls 25, respectively. A hollow space 39 is defined between each resilient wall 38 and the corresponding side wall 25 to provide resiliency to the resilient wall 38. The resilient walls 38 can also contribute to preventing wobbling movements of the held elongated member, and cope with variations in outer diameter of the elongated member.

With reference to FIG. 6, an operation of inserting the elongated member 3 into the receiving portion 22 of the holding portion 18 and holding the received elongated member 3 will be described below. The elongated member 3 is placed on and pressed against the resilient retaining wings 27. The second portion of the resilient retaining wing 27 between the connection end 33 and the intermediate position 35 has the predetermined angle α. Thus, a width of a passage for the elongated member 3 during the insertion operation is increased as compared with that of the conventional pipe holding portion (see FIG. 1) to facilitate guiding the elongated member 3 and accelerate a sliding movement of the elongated member 3 along the resilient retaining wing 27. Further, the increased distance "b" between the point of application 35 and the point of action 33 makes it possible to bendingly displace the resilient retaining wings 27 toward the respective side walls 25 with a lower pressing force so as to insert the elongated member 3 into the receiving portion 22 with a lower insertion force.

Just after the elongated member 3 passes through the resilient retaining wings 27 and enters the chamber of the receiving portion 22, the bendingly-displaced resilient retaining wings 27 are resiliently restored to their original postures. In conjunction with this restoring, the distal ends 34 of the resilient retaining wings 27 are engaged with the outer peripheral surface of the elongated member 3 to produce a resistance against pull-out of the elongated member 3 from the receiving portion 22. The bent first portion between the intermediate position 35 and the distal end 34 in each of the resilient retaining wings 27 restored to their original postures narrows a pull-out passage for the elongated member in the receiving portion 22. This makes it possible to maintain the resistance against pull-out of the received elongated member, at high level. In addition, even if a force causing pull-out of the elongated member 3 is applied to the resilient retaining wings 27, the second portion of each of the resilient retaining wings 27 extending at the predetermined small angle α relative to the side wall 25 of the receiving portion can resist the pull-out force so as to maintain the resistance against pull-out of the elongated member at high level.

Various types of prototype samples incorporating the present invention were prepared, and subjected to experimental tests. Through the tests, a desirable result was obtained when the predetermined small angle α of the second portion of the resilient retaining wing 27 between the connection end 33 and the intermediate position 35, relative to the side wall 25 of the receiving portion 25 was set in the range of about 10 to 20 degrees. Further, a desirable result was obtained when a length of the second portion of the resilient retaining wing 27 extending at the predetermined small angle α was set at a value slightly greater than half of an entire length of the resilient retaining wing 27. Furthermore, when the elongated member 3 is an elongated cylindrical member, a desirable result is obtained when the intermediate positions 35 in the pair of resilient retaining wings are set to allow an interior angle β between two lines connecting a center O of the cylindrical member 3 in contact with the pair of resilient retaining wings and respective ones of two contact points 35, so that the interior angle is greater than 100 degrees.

In the above tests, respective insertion forces of the conventional clamp having the receiving portion 1 (see FIG. 1) and the clamp according to the present invention having the receiving portion 22 (see FIG. 6) were compared using the same pipe as an elongated member to be held. In the conventional receiving portion 1, the distance "a" and the entire length "l" of the resilient retaining wing 8 were 1.1 mm and 3.1 mm, respectively. In the receiving portion 22 according to the present invention, the distance "b" and the entire length "L" of the resilient retaining wing 27 were 1.9 mm and 5.6 mm, respectively. The resilient retaining wing 27 in the clamp according to the present invention can be formed to have a length substantially two times greater that that of the conventional resilient retaining wing 8, to sufficiently resist a greater pull-out force as compared with the conventional resilient retaining wing. As to reduction in insertion force, based on the following formula: "a":"b"=(1.1):(1.9)=1:1.72, it can be calculated that the insertion force is reduced by about 1.7 times.

It was experimentally verified that an average insertion force required for the conventional clamp is 67.8 N (Newton). On the above assumption that the insertion force required for the clamp according to the present invention is reduced by 1.72 times as compared with the conventional clamp, a value of the insertion force can be calculated as follows: 67.8 (N)÷1.72=39.4 (N). Through a test in which the same type of pipe (diameter: 6.96φ) was inserted into each receiving portions 22 of two pipe holding portions A, B in a clamp according to the present invention, average insertion force of 41.6 N and 39.1N were obtained as shown in the following table.

| Pipe holding portion | pipe diameter (mm) | No. = 1 | 2 | 3 | 4 | 5 | average (N) |
|---|---|---|---|---|---|---|---|
| A | φ 6.96 | 41.2 (N) | 42.2 | 41.7 | 39.9 | 43.0 | 41.6 |
| B | φ 6.96 | 38.8 | 38.7 | 39.4 | 38.5 | 40.1 | 39.1 |

From the above result, it was verified that the actually-measured force required for inserting a pipe into the receiving portion 22 in the clamp according to the present invention can be reduced to approximately the same level as the theoretical value (39.4 N).

As mentioned above, based on the simple structure where the second portion of the resilient retaining wing between the point of application of a pressing force during insertion of an elongated member such as a pipe, and the connection end which is a point of action of the pressing force, is formed to extend at the predetermined small angle relative to the side wall of the receiving portion so as to increase the distance between the point of application and the point of action, a width of a passage for inserting the elongated member through the second portion of the resilient retaining wing can be increased to facilitate the insertion. This makes it possible to insert the elongated member into the receiving portion with a lower insertion force. Further, the first portion of the resilient retaining wing capable of narrowing the width of the passage for the elongated member makes it possible to provide enhanced resistance against pull-out of the inserted elongated member and maintain the resistance against pull-out of the held elongated member at high level.

While a preferred embodiment of the invention has been shown and described, changes can be made without departing from the principles and the spirit of the invention, the scope of which is defined in the accompanying claims.

What is claimed is:

1. A clamp for an elongated member comprises a receiving portion defining a chamber for receiving and holding the elongated member therein and a resilient retaining wing extending obliquely from an inlet end of an adjacent side wall of the receiving portion toward a bottom of the receiving portion, the resilient wing having flexibility to be bendingly displaced closer to the adjacent side wall of the receiving portion when the elongated member is pressed into the receiving portion, so as to allow the elongated member to pass through the inlet to the receiving portion, and then engaged with an outer peripheral surface of the elongated member received in the receiving portion so as to produce a resistance against pull-out of the elongated member from the receiving portion;

wherein the resilient retaining wing of the clamp has a connection end connected to the inlet end of the adjacent side wall of the receiving portion to serve as a support point for allowing the entire resilient retaining wing to be bendingly displaced closer to the adjacent side wall of the receiving portion thereabout;

the resilient retaining wing is bent in a direction away from the adjacent side wall of the receiving portion at an intermediate position located between the connection end and a distal end of the wing so as to make the width of a passage for the elongated member narrower in a first portion between the intermediate position and the distal end than in a second portion between the connection end and the intermediate position;

a point of application of a pressing force during the insertion of the elongated member is set at the intermediate position, and a point of action of the pressing force is set at the connection end; and the second portion of the resilient retaining wing extends toward the bottom of the receiving portion obliquely at a predetermined small angle relative to the adjacent side wall of the receiving portion so as to increase a distance between the point of application and the point of action, whereby, when the elongated member is received in the receiving portion, the distal end of the resilient retaining wing is engaged with the outer peripheral surface of the elongated member to produce a resistance against pull-out of the elongated member from the receiving portion; and wherein the predetermined small angle is in the range between 10 to 20 degrees.

2. The clamp as defined in claim 1, which includes a pair of the resilient retaining wings extending obliquely from inlet ends of respective adjacent side walls of the receiving portion toward the bottom of the receiving portion.

3. The clamp as defined in claim 1, wherein the resilient retaining wing is formed as a plate which has a width extending in a longitudinal direction of the elongated member held in the receiving portion, a length extending from the connection end to the distal end, and a thickness gradually increasing at least in the first portion extending from the intermediate position to the distal end.

4. The clamp as defined in claim 1, wherein a surface of the wing facing away from the adjacent side wall is concave.

5. The clamp as recited in claim 1, wherein the elongated member is an elongated cylindrical member, and wherein the first portions in the pair of resilient retaining wings are set to allow an interior angle between two lines connecting a center of the cylindrical member in contact with the pair of resilient retaining wings and respective ones of two contact points of the wings with the cylindrical member, with the interior angle being greater than 100 degrees.

6. The clamp as recited in claim 5, wherein the second portion of the resilient retaining wing extending from the connection end to the intermediate position has a length slightly greater than half of an entire length of the resilient retaining wing.

7. A clamp for an elongated member comprises a receiving portion defining a chamber for receiving and holding the elongated member therein and a resilient retaining wing extending obliquely from an inlet end of an adjacent side wall of the receiving portion toward a bottom of the receiving portion, the resilient wing having flexibility to be bendingly displaced closer to the adjacent side wall of the receiving portion when the elongated member is pressed into the receiving portion, so as to allow the elongated member to pass through the inlet to the receiving portion, and then engaged with an outer peripheral surface of the elongated member received in the receiving portion so as to produce a resistance against pull-out of the elongated member from the receiving portion;

wherein the resilient retaining wing of the clamp has a connection end connected to the inlet end of the adjacent side wall of the receiving portion to serve as a support point for allowing the entire resilient retaining wing to be bendingly displaced closer to the adjacent side wall of the receiving portion thereabout;

the resilient retaining wing is bent in a direction away from the adjacent side wall of the receiving portion at an intermediate position located between the connection end and a distal end of the wing so as to make the width of a passage for the elongated member narrower in a first portion between the intermediate position and the distal end than in a second portion between the connection end and the intermediate position;

a point of application of a pressing force during the insertion of the elongated member is set at the intermediate position, and a point of action of the pressing force is set at the connection end; and the second portion of the resilient retaining wing extends toward the bottom of the receiving portion obliquely at a predetermined small angle relative to the adjacent side wall of the receiving portion so as to increase a distance between the point of application and the point of action, whereby, when the elongated member is received in the receiving portion, the distal end of the resilient retaining wing is engaged with the outer peripheral surface of the elongated member to produce a resistance against pull out of the elongated member from the receiving portion;

wherein the elongated member is an elongated cylindrical member, and wherein the first portions in the pair of resilient retaining wings are set to allow an interior angle between two lines connecting a center of the cylindrical member in contact with the pair of resilient retaining wings and respective ones of two contact points of the wings with the cylindrical member, with the interior angle being greater than 100 degrees.

8. A clamp for an elongated member comprises a receiving portion defining a chamber for receiving and holding the elongated member therein and a resilient retaining wing extending obliquely from an inlet end of an adjacent side wall of the receiving portion toward a bottom of the receiving portion, the resilient wing having flexibility to be bendingly displaced closer to the adjacent side wall of the receiving portion when the elongated member is pressed into the receiving portion, so as to allow the elongated member to pass through the inlet to the receiving portion, and then engaged with an outer peripheral surface of the elongated member received in the receiving portion so as to produce a resistance against pull-out of the elongated member from the receiving portion;

wherein the resilient retaining wing of the clamp has a connection end connected to the inlet end of the adjacent side wall of the receiving portion to serve as a support point for allowing the entire resilient retaining wing to be bendingly displaced closer to the adjacent side wall of the receiving portion thereabout;

the resilient retaining wing is bent in a direction away from the adjacent side wall of the receiving portion at an intermediate position located between the connection end and a distal end of the wing so as to make the width of a passage for the elongated member narrower in a first portion between the intermediate position and the distal end than in a second portion between the connection end and the intermediate position;

a point of application of a pressing force during the insertion of the elongated member is set at the intermediate position, and a point of action of the pressing force is set at the connection end; and the second portion of the resilient retaining wing extends toward the bottom of the receiving portion obliquely at a predetermined small angle relative to the adjacent side wall of the receiving portion so as to increase a distance between the point of application and the point of action, whereby, when the elongated member is received in the receiving portion, the distal end of the resilient retaining wing is engaged with the outer peripheral surface of the elongated member to produce a resistance against pull-out of the elongated member from the receiving portion;

wherein the second portion of the resilient retaining wing extending from the connection end to the intermediate position has a length slightly greater than half of an entire length of the resilient retaining wing.

9. A clamp assembly comprising:

an elongated cylindrical member;

a clamp, the clamp comprising:

a base;

at least one first holding portion extending from a top of the base and holding the elongated member; and an anchor extending from a bottom of the base;

wherein the first holding portion comprises a pair of opposing side walls, a curved bottom, and a pair of resilient wings, the resilient wings extending from tops of the opposing sidewalls towards one another and the curved bottom;

wherein the elongated member sits on the curved bottom and is held in place by the resilient wing members;

wherein each resilient wing comprises a connection end connecting the resilient wing to one of the side walls and a distal end which engages a surface of the elongated member; and wherein an angle between the resilient wings and the respective adjacent side walls is between 10 to 20 degrees.

10. The clamp assembly of claim 9, wherein the resilient wings are bent in a direction away from the adjacent side wall of the receiving portion at an intermediate position located between the connection end and the distal end of the wing so as to make the width of a passage for the elongated member narrower in a first portion between the intermediate position and the distal end than in a second portion between the connection end and the intermediate position;

wherein a point of application of a pressing force during the insertion of the elongated member is set at the intermediate position, and a point of action of the pressing force is set at the connection end; and wherein the first portions in the pair of resilient retaining wings are set to allow an interior angle between two lines connecting a center of the cylindrical member in contact with the pair of resilient retaining wings and respective ones of two contact points of the wings with the cylindrical member, with the interior angle being greater than 100 degrees.

11. The clamp assembly of claim 10, wherein the clamp further comprises at least one second holding portion, the second holding portion extending from the top of the base and comprising an aperture for holding a second elongated member;

wherein the second holding portion includes only a single resilient wing member, the second elongated member being held in the aperture by the single resilient wing member of the second holding portion.

12. The clamp assembly of claim 9, wherein surfaces of the retaining wings facing away from the adjacent side wall are concave.

13. The clamp assembly of claim 12, wherein the resilient retaining wings arc bent in a direction away from the adjacent side wall of the receiving portion at an intermediate position located between the connection end and the distal end of the wing so as to make the width of a passage for the elongated member narrower in a first portion between the intermediate position and the distal end than in a second portion between the connection end and the intermediate position;

wherein a portion of the resilient retaining wing extending from the connection end to the intermediate position has a length slightly greater than half of an entire length of the resilient retaining wing.

14. The clamp assembly of claim 13, further comprising a pair of resilient walls separated from the side walls by a hollow space.

15. The clamp assembly of claim 14, wherein the resilient wails are substantially parallel to the side walls.

\* \* \* \* \*